United States Patent
Nilsson et al.

(10) Patent No.: US 9,294,162 B2
(45) Date of Patent: Mar. 22, 2016

(54) OUTDOOR-INDOOR MIMO COMMUNICATION SYSTEM USING MULTIPLE REPEATERS AND LEAKY CABLES

(75) Inventors: Andreas Nilsson, Gothenburg (SE); Henrik Asplund, Stockholm (SE); Mikael Coldrey, Landvetter (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 75 days.

(21) Appl. No.: 14/236,651

(22) PCT Filed: Aug. 4, 2011

(86) PCT No.: PCT/EP2011/063472
§ 371 (c)(1),
(2), (4) Date: Feb. 3, 2014

(87) PCT Pub. No.: WO2013/017175
PCT Pub. Date: Feb. 7, 2013

(65) Prior Publication Data
US 2014/0170966 A1    Jun. 19, 2014

(51) Int. Cl.
| H04B 7/14 | (2006.01) |
| H04W 16/26 | (2009.01) |
| H04B 7/02 | (2006.01) |
| H04B 7/04 | (2006.01) |

(Continued)

(52) U.S. Cl.
CPC .............. *H04B 7/026* (2013.01); *H04B 7/0413* (2013.01); *H04B 7/0486* (2013.01); *H04B 7/15* (2013.01); *H04B 7/15514* (2013.01); *H04B 7/2606* (2013.01); *H04W 16/26* (2013.01); *H04B 5/0018* (2013.01); *H04B 7/10* (2013.01)

(58) Field of Classification Search
None
See application file for complete search history.

(56) References Cited

U.S. PATENT DOCUMENTS 4,866,732 A * 9/1989 Carey et al. ............... 455/523 X
2009/0061939 A1   3/2009 Andersson et al.
(Continued)

FOREIGN PATENT DOCUMENTS

WO    2009015101 A1    1/2009

OTHER PUBLICATIONS

Official Action issued on Apr. 20, 2015 in Mexican application No. MX/a/2014/000310, 3 pages.

(Continued)

*Primary Examiner* — Philip Sobutka
(74) *Attorney, Agent, or Firm* — Rothwell, Figg, Ernst & Manbeck, P.C.

(57) ABSTRACT

The invention relates to a wireless outdoor-indoor multiple-input multiple-output (MIMO) communications system for communicating with user equipment located inside a physical structure such as a building. The MIMO communication system is comprised of a node having at least two node antennas, wherein the node is configured for line of sight (LOS) wireless MIMO communication with at least two outdoor-indoor repeaters, and of at least two outdoor-indoor repeaters adapted for LOS wireless MIMO communication with the node. The repeaters have at least one repeater antenna each, provided outside the physical structure, for LOS MIMO communication with the node and at least one leaky cable each, provided inside the physical structure, for indoor MIMO communication with the user equipment located inside the physical structure. The repeaters are provided outside on the same physical structure and spaced well-apart, and each leaky cable of each repeater is provided such that they provide the same indoor coverage of the same interior space in the physical structure.

17 Claims, 8 Drawing Sheets

(51) Int. Cl.
$H04B$ $7/26$ (2006.01)
$H04B$ $7/15$ (2006.01)
$H04B$ $7/155$ (2006.01)
$H04B$ $5/00$ (2006.01)
$H04B$ $7/10$ (2006.01)

(56) References Cited

U.S. PATENT DOCUMENTS

2009/0175214 A1   7/2009   Sfar et al.
2011/0124347 A1*  5/2011   Chen et al. ............... 455/456.1

OTHER PUBLICATIONS

Cho, et al., "Practical Scheme to enable MIMO Communication in Distributed Antenna Systems for Efficient Indoor Coverage", Communications and Information Technology 2009, ISCIT 2009 9th International Symposium, IEEE, Piscataway, NJ, USA, Sep. 28, 2009, pp. 25-28, XP031571371.

Coldrey, et al., "Higher Order MIMO Outdoor-to-Indoor Measurements Using Repeaters", 2010 IEEE Vehicular Technology Conference (VTC-2010-Spring), May 16-19, 2010, Taipei, Taiwan, IEEE, 5 pages, XP031696336.

Mouhamadou, et al., "Multi-Band Diversity Antenna Performances Evaluation for Multi-Standard Compact Wireless Terminal", 3rd Eurpoean Conference on Antennas and Propagation, EUCAP 2009, Mar. 23-27, 2009, Berlin, Germany, IEEE Piscataway, NJ, USA, pp. 1603-1607, XP031470094.

Walkenhorst, et al., "Multiple Repeater Placement for Assisting Long-Range LOS MIMO Links", IEEE Global Telecommunications Conference, 2009. GLOBECOM 2009, 5 pages.

* cited by examiner

```
┌─────────────────────────────┐
│ Configure the node antennas and the │
│ repeater antennas for dual-polarization │──── 501
│     communication.          │
└─────────────────────────────┘
```

Fig. 5a

```
┌─────────────────────────────┐
│ Configure the leaky cables for dual- │──── 502
│   polarization communication.        │
└─────────────────────────────┘
```

Fig. 5b

```
┌─────────────────────────────┐
│ Configure each repeater to comprise the │
│  same number of leaky cables as the     │──── 503
│     number of repeater antennas.        │
└─────────────────────────────┘
```

Fig. 5c

Configure the first and the second repeater to share at least one leaky cable, and adapt the first repeater to feeds the shared at least one leaky cable at one end and adapt the second repeater to feed the shared at least one leaky cable at the other end. — 504

Fig. 5d

Configure the first repeater to share at least one leaky cable with a second repeater and to share at least one other leaky cable with a third repeater, and adapt the first repeater to feeds said shared at least one leaky cable at one end and adapt the second repeater to feed the shared at least one leaky cable at the other end. Also adapt the first repeater to feed the shared at least one other leaky cable at one end and adapt the third repeater to feed the shared at least one other leaky cable at the other end. — 505

Fig. 5e

Configure at least four repeaters to share at least one leaky cable with another repeater, and configuring the at least four repeaters to be connected as to form a linear daisy chain of repeaters sharing at least one leaky cable with another repeater. — 506

Fig. 5f

OUTDOOR-INDOOR MIMO COMMUNICATION SYSTEM USING MULTIPLE REPEATERS AND LEAKY CABLES

CROSS REFERENCE TO RELATED APPLICATION(S)

This application is a 35 U.S.C. §371 National Phase Entry Application from PCT/EP2011/063472 filed Aug. 4, 2011, the disclosure of which is incorporated by reference.

TECHNICAL FIELD

The present invention relates to the field of wireless communication systems and, in particularly, to outdoor-indoor multiple-input multiple-output (MIMO) communication systems for communicating with user equipment located inside a physical structure such as a building.

BACKGROUND

A large part of today's traffic load in wireless communication comes from users inside physical structures such as office buildings, shopping malls, cafés and restaurants, etc. Providing these indoor users with good coverage, high bit-rate and spectrally efficient communication from outside base stations is very challenging due to, for example, the penetration loss that occurs when the communication signals propagates through the walls of the building.

A well-known solution for enhancing communication signals inside a building is to use outdoor-indoor repeaters. An outdoor-indoor repeater has a pick-up antenna placed on the outside of the building connected via a double-directional power amplifier to a donor antenna placed on the inside of the building. Thus, signals from the base station are received by the pick-up antenna on the outside of the building, where the signal level is high, and then the signals are re-radiated inside the building by the donor antenna, and thereby circumventing the penetration loss. In a similar manner, communication signals from user equipment (UE), such as mobile phones and portable computer equipment, inside the building are received by the donor antenna located inside the building, and re-radiated by the pick-up antenna on the outside of the building. Typically, the pick-up antenna of the repeater on the outside of the building is placed in line of sight (LOS) of the base station antenna to ensure good link quality.

A well-known way of improving spectral efficiency in a wireless communications system is to utilize a multiple-input multiple-output (MIMO) communication system. Provided that both transmitter and receiver uses more than one antenna (e.g. K transmit antennas and M receive antennas), and that the channels between different pairs of transmit and receive antennas have similar power and can be made orthogonal, gains in spectral efficiency on the order of min(M,K) are possible to achieve. To allow indoor users communicating via a repeater to fully benefit from MIMO gains there needs to be at least as many repeater antennas as there are antennas at the base station.

Outdoor-indoor MIMO repeaters ensure good indoor coverage which implies high signal strengths. However the indoor coverage is typically limited to the close vicinity of the repeater donor antennas which usually are co-located with the repeater itself. Furthermore, as mentioned above, there is usually LOS between the base station and the repeater pick-up antennas in order to ensure a good link quality for the desired communication signals, and it is well known in the art that it is hard to achieve MIMO channels of more than rank two in a LOS environment since the spatially separated antennas will experience high correlation. Achieving sufficiently low correlation in a LOS environment might require a very large spatial separation of the repeaters antenna elements, which might make it difficult to co-locate the indoor donor antennas with the repeater and the pick-up antennas. Having non co-located donor antennas could lead to severe power imbalances between the donor antennas when for instance communicating with user equipment closer to one of the donor antennas, which in its turn will result in lower MIMO gains.

Thus, finding a way to offer good indoor coverage with high bit-rate and spectrally efficient communication is therefore highly sought for.

SUMMARY OF THE INVENTION

With the above description in mind, then, an aspect of the present invention is to provide a wireless communications system which seeks to mitigate, alleviate, or eliminate one or more of the above-identified deficiencies in the art and disadvantages singly or in any combination.

A first aspect of the present invention relates to a wireless MIMO communications system for communicating with user equipment located inside a physical structure, comprising a node adapted for MIMO communication, having at least two node antennas, wherein said node is further configured for LOS wireless MIMO communication over a first radio channel with at least two outdoor-indoor repeaters, and at least two outdoor-indoor repeaters adapted for LOS MIMO communication with said node over said first radio channel, wherein said repeaters having at least one repeater antenna each, provided outside said physical structure, for outdoor LOS MIMO communication with said node, wherein said repeaters are each connected to at least one leaky cable, provided inside said physical structure, for indoor MIMO communication over a second radio channel with said user equipment located inside said physical structure, characterized in that said repeaters are provided outside on the same physical structure and spaced well-apart such that the first radio channel between the node and the repeaters support a rank that is equal to the number of repeater antennas, said at least one leaky cable is provided such that essentially the same indoor coverage of the same interior space in said physical structure is provided from each repeater, said at least one leaky cable is provided such that said second radio channel between the repeaters and user equipment located inside said physical structure support a rank that is equal to the number of repeater antennas. In this way excellent indoor coverage with high bit-rate and spectrally efficient communication can be offered, in a cost efficient way, to users communicating wirelessly from within a building.

The first radio channel and said second radio channel in the wireless communication system may further be the same radio channel.

The node antennas and the repeater antennas in the wireless communication system may further be dual-polarized antennas. In this way polarization diversity could be used to further extend the capacity of the wireless communication system.

The leaky cables in the wireless communication system may further be dual-polarized leaky cables. In this way polarization diversity could be used to further extend the capacity of the wireless communication system.

The number of leaky cables of each repeater in the wireless communication system may further be the same as the number of repeater antennas of each repeater.

The first and the second repeater in the wireless communication system may further share at least one leaky cable, and wherein said first repeater may feed said shared at least one leaky cable at one end and said second repeater may feed said shared at least one leaky cable at the other end. In this way the number of leaky cables can be halved.

The first repeater in the wireless communication system may further share at least one leaky cable with a second repeater and may share at least one other leaky cable with a third repeater, wherein said first repeater may feed said shared at least one leaky cable at one end and said second repeater may feed said shared at least one leaky cable at the other end, and wherein said first repeater may feed said shared at least one other leaky cable at one end and said third repeater may feed said shared at least one other leaky cable at the other end. In this way the number of leaky cables can be halved.

At least four repeaters in the wireless communication system may further share at least one leaky cable with another repeater and connected as to form a linear daisy chain of repeaters sharing at least one leaky cable with another repeater. In this way the number of leaky cables can be halved.

Any of the features in the first aspect of the present invention above may be combined, in any way possible, as to form different embodiments of the present invention.

A second aspect of the present invention relates to a method for providing wireless MIMO communication between a node, located outside a physical structure, and user equipment, located inside said physical structure, the method comprising configuring said node for LOS wireless MIMO communication with at least two outdoor-indoor repeaters provided outside said physical structure, configuring at least one repeater antenna on each said outdoor-indoor repeater, located outside said physical structure, for outdoor LOS MIMO communication with said node, configuring at least one leaky cable on each said outdoor-indoor repeater, located inside said physical structure, for indoor MIMO communication over a second radio channel with said user equipment located in an interior space inside said physical structure, characterized by providing said repeaters outside on the same physical structure and spaced well-apart such that the first radio channel between the node and the repeaters support a rank that is equal to the number of repeater antennas, providing said at least one leaky cable such that essentially the same indoor coverage of the same interior space in said physical structure is provided from each repeater, and providing said at least one leaky cable such that said second radio channel between the repeaters and user equipment located inside said physical structure support a rank that is equal to the number of repeater antennas.

The method may further comprise the step of configuring said node antennas and said repeater antennas for dual-polarization communication.

The method may further comprise the step of configuring said leaky cables for dual-polarization communication.

The method may further comprise the step of configuring said each repeater to comprise the same number of leaky cables as the number of repeater antennas.

The method may further comprise the step of configuring a first and a second repeater to share at least one leaky cable, and wherein said first repeater is adapted to feed said shared at least one leaky cable at one end, and said second repeater is adapted to feed said shared at least one leaky cable at the other end.

The method may further comprise the step of configuring a first repeater to share at least one leaky cable with a second repeater and to share at least one other leaky cable with a third repeater, wherein said first repeater is adapted to feeds said shared at least one leaky cable at one end and said second repeater is adapted to feed said shared at least one leaky cable at the other end, and wherein said first repeater is further adapted to feed said shared at least one other leaky cable at one end and said third repeater is adapted to feed said shared at least one other leaky cable at the other end.

The method may further comprise the step of configuring at least four repeaters to share at least one leaky cable with another repeater, and configuring said at least four repeaters to be connected as to form a linear daisy chain of repeaters sharing at least one leaky cable with another repeater.

Any of the features in the second aspect of the present invention above may be combined, in any way possible, as to form different embodiments of the present invention. All of the benefits described in conjunction with the first aspect of the present invention may in the same way be applied to the second aspect of the present invention.

BRIEF DESCRIPTION OF THE DRAWINGS

Further objects, features, and advantages of the present invention will appear from the following detailed description of some embodiments and variants of the invention, wherein some embodiments or variants of the invention will be described in more detail with reference to the accompanying drawings, in which:

FIG. 5a-5f shows a collection of flowcharts describing different embodiments and variations of the present invention.

DETAILED DESCRIPTION

Figure 1:
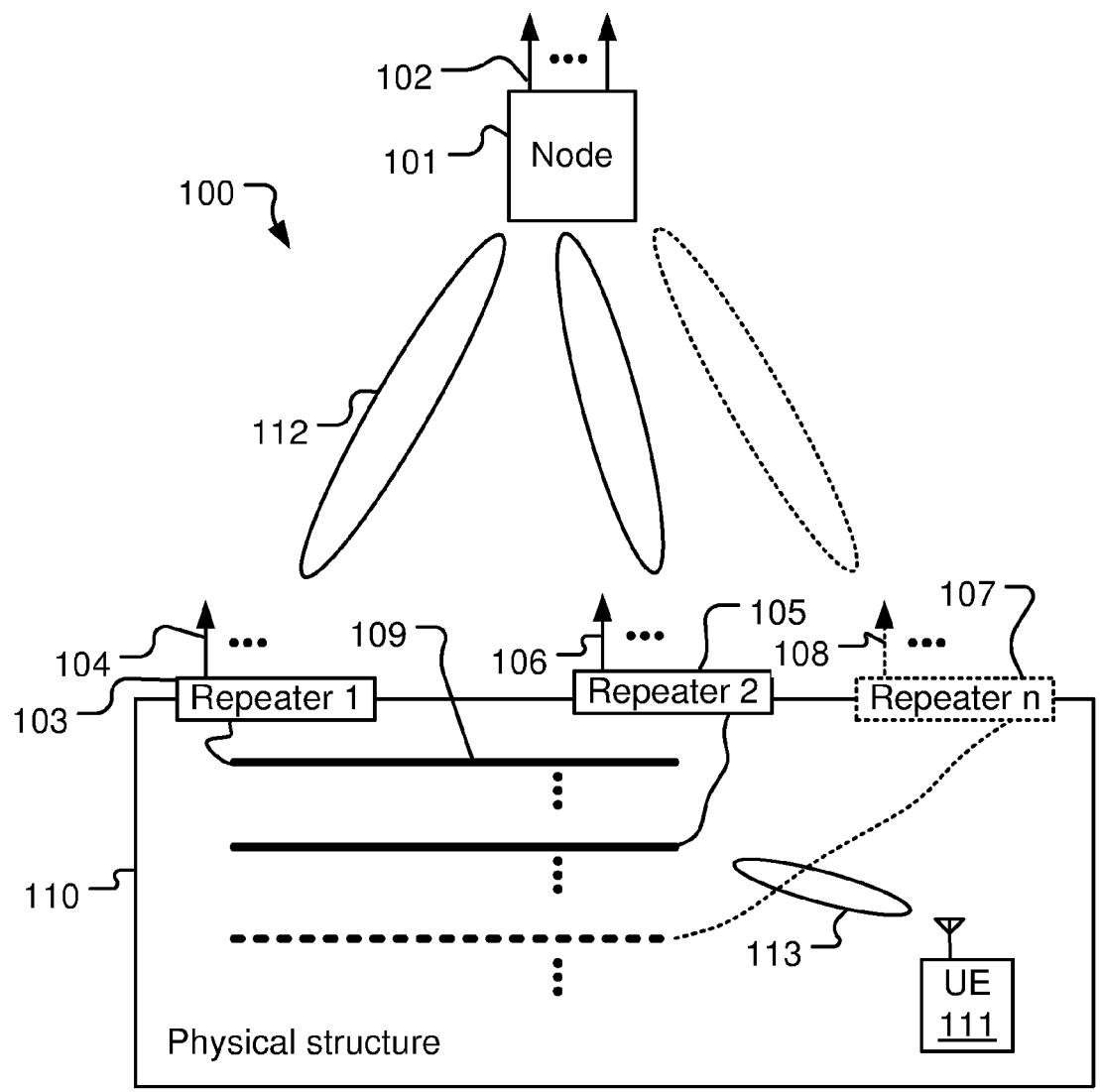
FIG. 1 shows a block diagram of a wireless outdoor-indoor MIMO communications system, employing multiple MIMO repeaters and leaky cables, for communicating with user equipment located inside a physical structure, according to an embodiment of the present invention.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout the description.

A way of offering good indoor coverage along with high bit-rate and spectrally efficient communication is to utilize a wireless outdoor-indoor MIMO communications system 100 according to an embodiment of the present invention. The wireless outdoor-indoor MIMO communications system 100, shown in FIG. 1, comprise of a node 101, and at least (as indicated by the dots in the figure) two node antennas 102, adapted for wireless MIMO communication. The term node will be used through out the description of the different embodiments and variants of the present invention, and should be interpreted as to include any type of wireless communication redistribution point, such as a base station, or endpoint, such as user equipment. The node 101 may further be configured for line of sight (LOS) MIMO communication over a first radio channel 112 with at least two outdoor-indoor repeaters 103, 105, 107. In a variant the node 101 may also be configured for non LOS MIMO communication over a first radio channel with said repeaters 103, 105, 107.

The in outdoor-indoor repeaters 103, 105, 107 in FIG. 1 may be adapted for LOS MIMO and/or for non LOS MIMO communication over the first radio channel 112 with at least one node 101 having at least two node antennas 102. Each repeater 103, 105, 107 may have at least one repeater antenna 104, 106, 108 being adapted to receive and to transmit communication signals to and from said node 101 over the first radio channel 112. The in outdoor-indoor repeaters 103, 105, 107, and their repeater antennas 104, 106, 108, are usually placed on, or in close proximity, to the physical structure in which the repeater is going to provide indoor coverage. Usually the repeater antennas 104, 106, 108 are placed or mounted on the outer walls, the façade, of the physical structure 110 in close proximity to the repeaters, to minimize cable losses and for reducing installation costs, and typically in LOS of said node antennas 102 in order to maximize the signal strength of the communication signals transmitted between the antennas 102, 104, 106, 108 over the first radio channel 112.

The physical structure 110 may be any type of man made structure such as a multi-storage building having several interior spaces (such as rooms, hallways, etc.) of different sizes and shapes, to a small house-like building containing only one interior space (one room). The term physical structure 110 should also be interpreted to include any man-made or any non man-made underground structure such as a mine, cave or the like.

The repeaters 103, 105, 107 may be mounted either on the outer walls or the inner walls (or both) of the physical structure 110. The repeaters 103, 105, 107 provides a connection via a double-directional power amplifier between the repeater antennas 104, 106, 108, mounted on the outside of the physical structure 110, and the donor antennas 109 mounted on the inside of the physical structure 110. In the embodiment of the present invention the at least two outdoor-indoor repeaters 103, 105, 107, adapted for LOS MIMO communication over a first radio channel 112 with said node 101, having at least one repeater antenna each 104, 106, 108, are provided outside on the same physical structure 110. Preferably, the repeaters are spaced well-apart, usually ranging from several meters up to over 100 meters, and spaced such that the first radio channel 112 between the node 101 and the repeaters 103, 105, 107 support a rank that is equal to the number of repeater antennas 104, 106, 108. The separation distance between the repeaters will of cause depend on parameters such as the size of the building, the possibility of having LOS to the node 101, etc. By spatially separating the repeaters and their repeater antennas well-apart drastically reduces the correlation between them despite being implemented in a LOS environment, and thus making it possible to support a rank that is equal to the number of repeater antennas.

The donor antennas 109 may be implemented using any type of distributed antenna system. A distributed antenna system (DAS) is typically a network of spatially separated antenna nodes connected to a common source such as a repeater 103, 105, 107 which via a radio channel (in this case a second radio channel) provides wireless service within an interior space inside said physical structure 110. An example of a DAS is a so called leaky cable. A leaky cable is usually defined as being an insulated cable (usually a shielded coaxial cable) with slits or slots through the insulation enabling communication signals transported along its length to emanate out, in a controlled manner, into the immediately surrounding environment. Leaky cables are also known in literature as radiating cables or leaky wave slot antennas. From hereinafter leaky cables are used in the application text to exemplify the embodiments and variants of the present invention. However, the invention is not limited to the usage of leaky cables only, but could actually be realized using any type of DAS.

The at least two repeaters 103, 105, 107 are implemented, according to the embodiment of the present invention, with at least one (as indicated by the dots in the figure) leaky cable each 109, provided inside the physical structure 110, adapted for indoor MIMO communication over a second radio channel 113 with user equipment (UE) 111 located inside said physical structure. The leaky cables 109 are provided such that said second radio channel 113 between the repeaters 103, 105, 107 and user equipment 111 located inside said physical structure 110 support a rank that is equal to the number of repeater antennas 104, 106, 108. The UE 111 may be any type of equipment capable of communicating wirelessly such as mobile phones and computer equipment (i.e. laptops, table-top computers, pads, etc.). The UE 111 may be stationary in said interior space in the physical structure 110 or it may be capable of moving (i.e. mobile) between different interior spaces inside the physical structure 110. The UE 111 may or may not be adapted for MIMO communication with the leaky cables 109 over the second radio channel 113. Each leaky cable 109 of each repeater 103, 105, 107 are provided such that they provide essentially the same unified indoor coverage of essentially the same interior space in said physical structure 111. The term "essentially" should be interpreted as meaning both "exactly the same" and "close to, but not exactly the same", since in reality it would be difficult to achieve exactly the same coverage of an interior space by having two physical cables (even placed on top of each other). By employing leaky cables covering essentially the same interior space the power imbalance in the MIMO channel that would occur in a traditional repeater setup with ordinary donor antennas are virtually avoided. Another benefit with using leaky cables is that they provides a more uniform coverage in the interior space that it is implemented to cover in comparison with a traditional point-source antenna from which the coverage falls with a factor $1/r^2$ or faster.

The principles that the repeaters are provided outside on the same physical structure 110 and spaced well-apart such that the first radio channel 112 between the node 101 and the repeaters 103,105,107 support a rank that is equal to the number of repeater antennas 104,106,108, and that the leaky cables 109 are provided such that said second radio channel 113 between the repeaters 103,105,107 and user equipment 111 located inside said physical structure 110 support a rank that is equal to the number of repeater antennas 104,106,108, holds true for every embodiment and variant of the present invention presented in this text.

The first radio channel and the second radio channel mentioned above may be different radio channels or it may be the same radio channel, depending on the set up of the system and choice of equipment.

By employing the wireless outdoor-indoor MIMO communications system 100 as described above in conjunction with the description of FIG. 1, the object of the present invention will be fulfilled in that the communication system 100 provides indoor users with good coverage, high bit-rate and spectrally efficient communication from an outside base station. It is clear that with the presented communication system 100 a higher MIMO rank can be achieved compared to the traditional way of having repeaters with co-located pick-up antennas, as well as compared to repeaters with non-co-located donor antennas. The invention combines well-separated repeater antennas with indoor leaky cables covering essentially the same interior space which together will, with a high probability, give excellent higher-order MIMO indoor coverage over a large area. Another advantage of the present invention is that it improves the channel rank for the case of multi-stream transmissions in combination with outdoor-indoor repeaters. This will increase the spatial multiplexing gains for indoor users in communication with an outdoor base station via such repeaters, and lead among other things to improved user bitrates. As the majority of high data rate-users currently are and are expected to be (also in the future) indoor users, such improvements are especially desirable. Thus, the object of the present invention is therefore fulfilled.

Figure 1B:
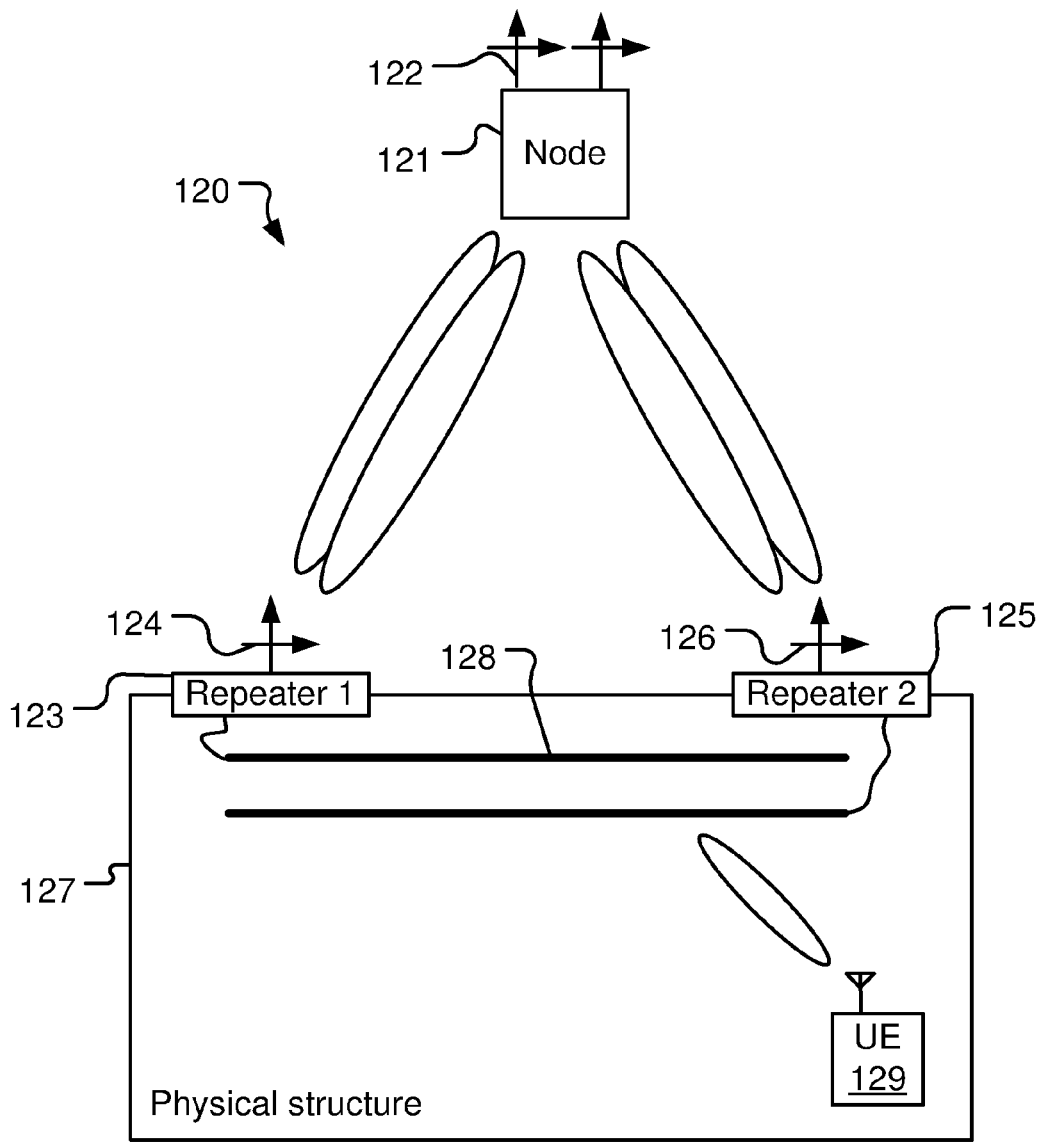
FIG. 1b shows a block diagram of a wireless outdoor-indoor MIMO communications system, employing multiple MIMO repeaters with dual-polarization and leaky cables, for communicating with user equipment located inside a physical structure, according to an embodiment of the present invention.

FIG. 1b shows a variant of the embodiment presented in conjunction with FIG. 1. In the variant the wireless outdoor-indoor MIMO communications system 120, depicted in FIG. 1b, is comprised of a node 121 having two dual-polarized node antennas adapted for wireless LOS MIMO communication with two repeaters 123, 125, having dual-polarized repeater antennas 124, 126, mounted well separated on a physical structure 127. Each repeater 123, 125 is connected to a leaky cable 128 covering essentially the same interior space in the physical structure 127. The leaky cables 128 may be a dual-polarized leaky cable or not. The leaky cables 128 are configured to communicate with UE 129 inside said physical structure. The communication system shown in FIG. 1b is not limited to using a node with only two dual-polarized node antennas and two repeaters employing one dual-polarized repeater antenna and one leaky cable each, but may be extended to employ several node antennas (dual-polarized or not) and several repeaters having multiple repeater antennas (dual-polarized or not) and leaky cables (dual-polarized or not). The main benefit with employing dual polarized antennas 122, 124, 126 and/or dual polarized leaky cables 128, is that the capacity of the communications system may be extended from a 2-by-2 MIMO system to a 4-by-4 MIMO system.

Figure 2:
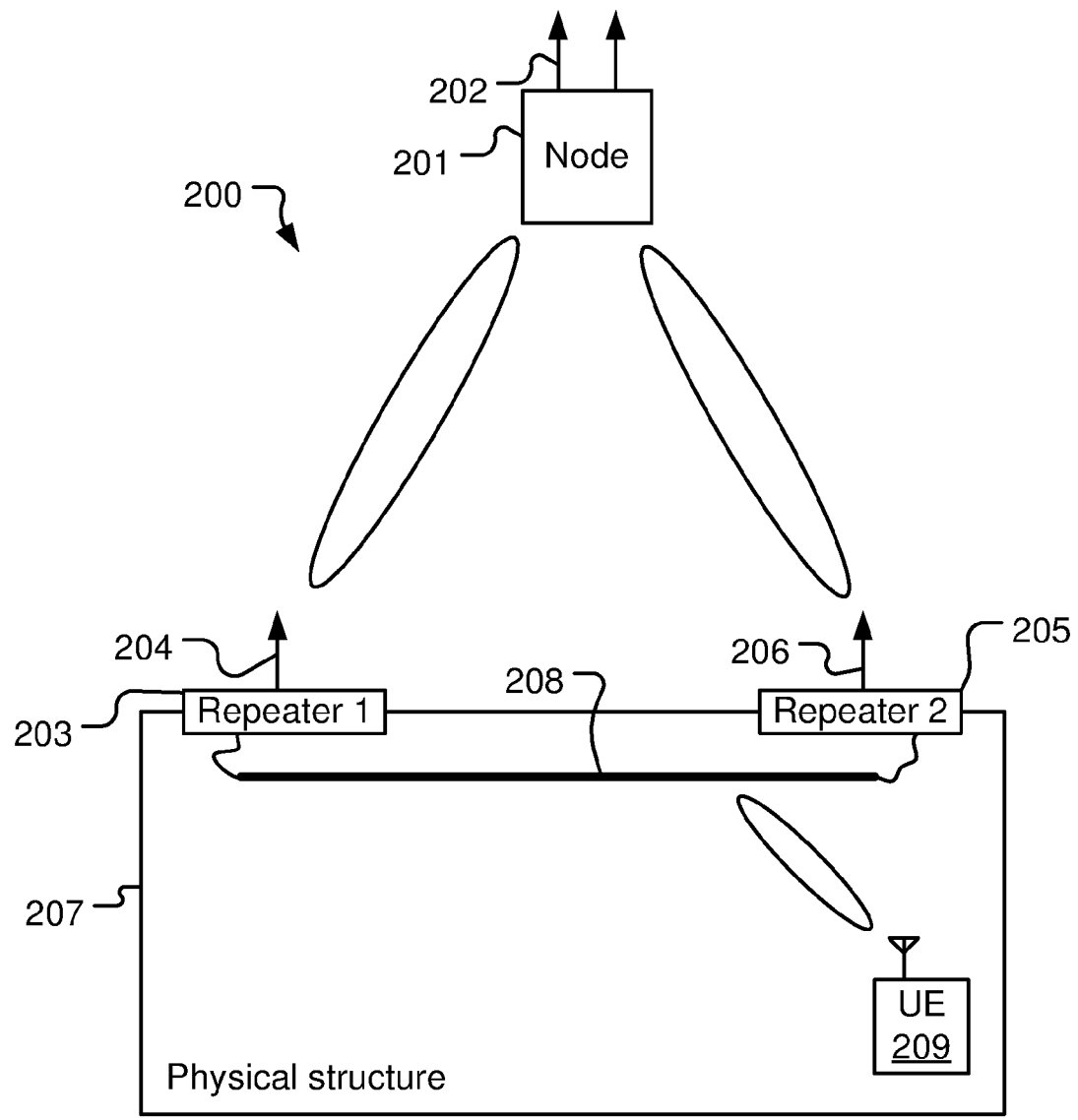
FIG. 2 shows a block diagram of a wireless outdoor-indoor MIMO communications system, employing two repeaters sharing a leaky cable, for communicating with user equipment located inside a physical structure, according to an embodiment of the present invention.

FIG. 2 shows yet another variant of the present invention. The wireless outdoor-indoor 2-by-2 MIMO communications system 200 depicted in FIG. 2 is comprised of a node 201 having two node antennas 202 adapted for wireless LOS MIMO communication with two repeaters 203, 205, having one repeater antenna 204, 206 each, mounted well separated on a physical structure 207. The difference between the previously presented communications systems 100, 120 above and the communication system 200 in FIG. 2 is that the two repeaters, the first 203 and the second 205 repeater, utilize and share the same leaky cable 208. The first repeater 203 feeds the shared leaky cable 208 at one end and the second repeater 205 feeds the shared leaky cable 208 at the other end. In this case the leaky cable 208 is made to support two modes of propagation, one in each direction of the cable. A typical leaky cable radiates at an angle with respect to the cable, where the angle can range from small (the cable radiates along the direction of the cable, the so called "coupled mode") to large (the cable radiates primarily away from the direction of the cable, the so called "radiating mode"). The exact angle is a function of the cable design (such as the spacing between the slits) and the frequency used. The leaky cable fed with one antenna port at either end is therefore a type of multi-mode antenna, and will be able to support two-stream transmission to and from UE 209 from the use of antenna pattern diversity. A benefit of employing shared leaky cables is that only half the number of leaky cables needs to be used and thus both the material and the installation cost is reduced. Another benefit is also that "both antennas" covers exactly the same interior space.

Figure 3A:
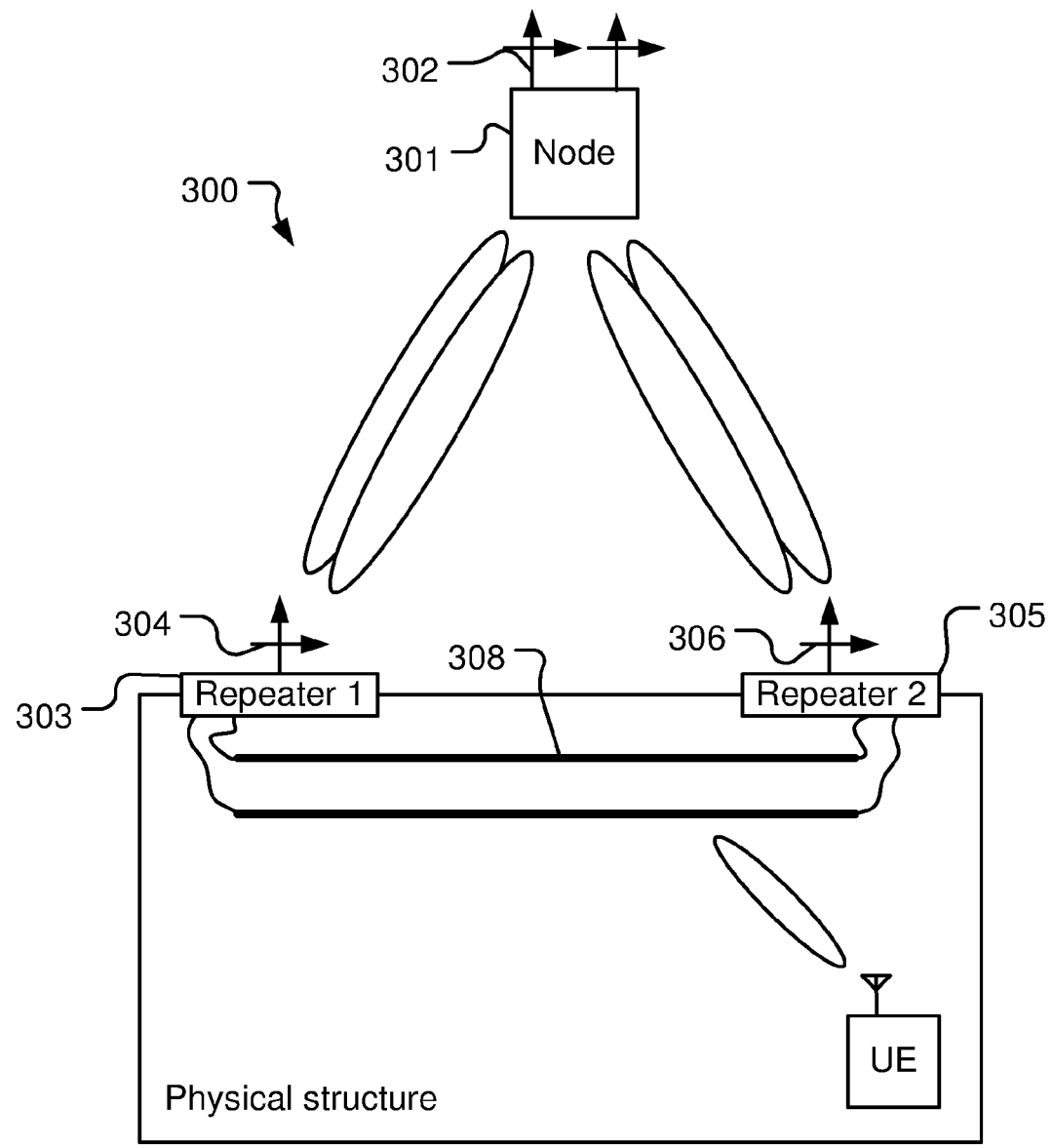
FIG. 3a shows a block diagram of a wireless outdoor-indoor MIMO communications system, employing two repeaters using dual-polarization sharing a leaky cable, for communicating with user equipment located inside a physical structure, according to an embodiment of the present invention.

The variant of the present invention shown in FIG. 3a may be extended from a 2-by-2 MIMO communications system 200 to a 4-by-4 MIMO communications system 300 by using additional spatially separated leaky cables 308 and/or dual-polarized leaky cables together with repeaters 303, 305, employing dual-polarized antennas for communicating with a node 301 employing dual-polarized antennas. In this case, only one leaky cable per pair of repeater antenna ports is required.

Figure 3B:
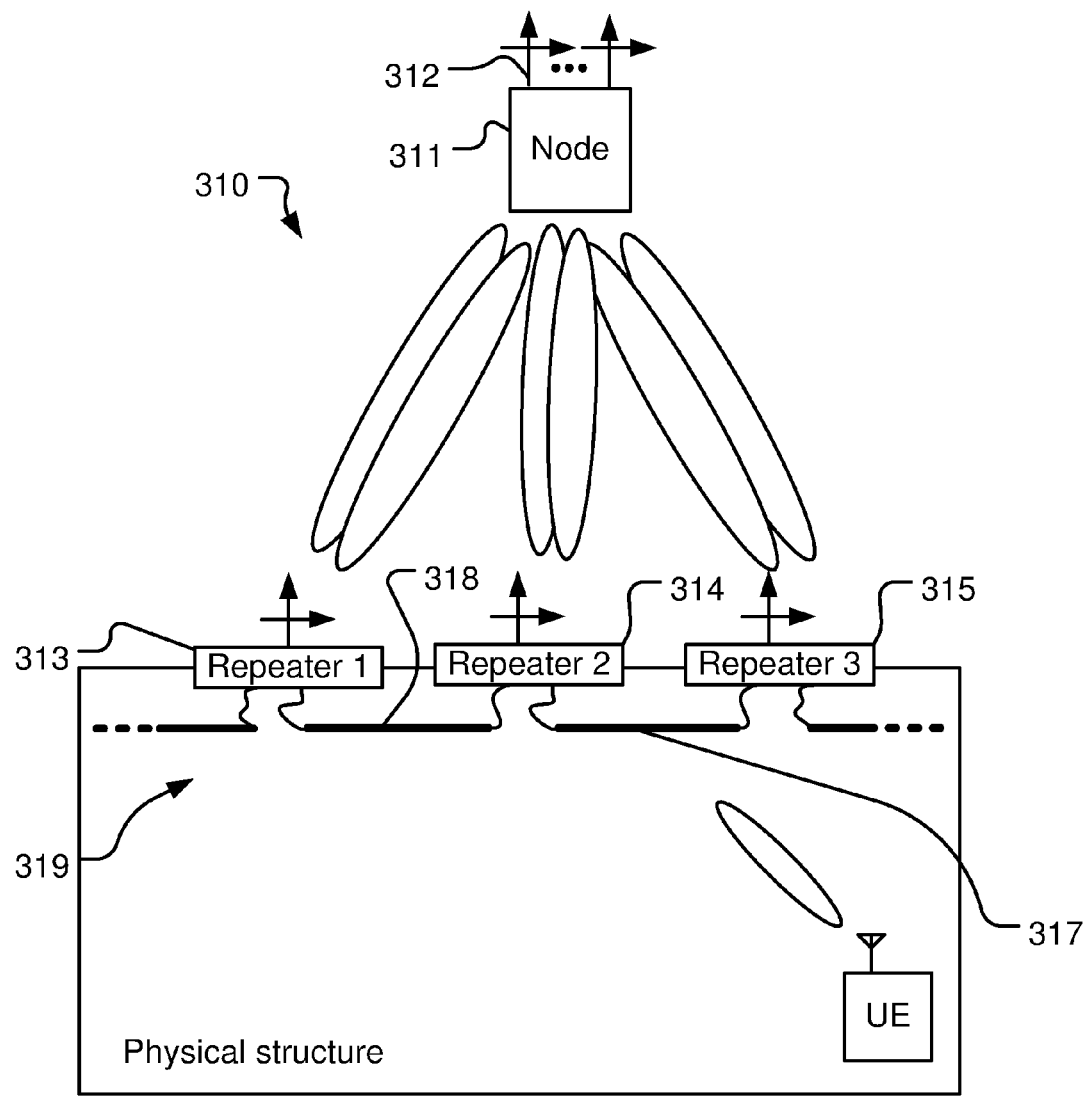
FIG. 3b shows a block diagram of a wireless outdoor-indoor MIMO communications system, employing several repeaters sharing leaky cables with neighboring repeaters, for communicating with user equipment located inside a physical structure, according to an embodiment of the present invention.

As shown in FIG. 3b the MIMO communications systems 300 shown in conjunction with FIG. 3a may be further extended by letting several repeaters share leaky cable with neighboring repeaters. The capacity of MIMO communications systems 310 in FIG. 3b may then be further extended by employing a node 311 with multiple dual-polarized antennas 312, and a number of repeaters 313, 314, 315, having dual-polarized repeater antennas, connected as to form a linear daisy chain of repeaters 313, 314, 315 sharing at least one leaky cable 317 with a neighboring repeater.

Figure 4:
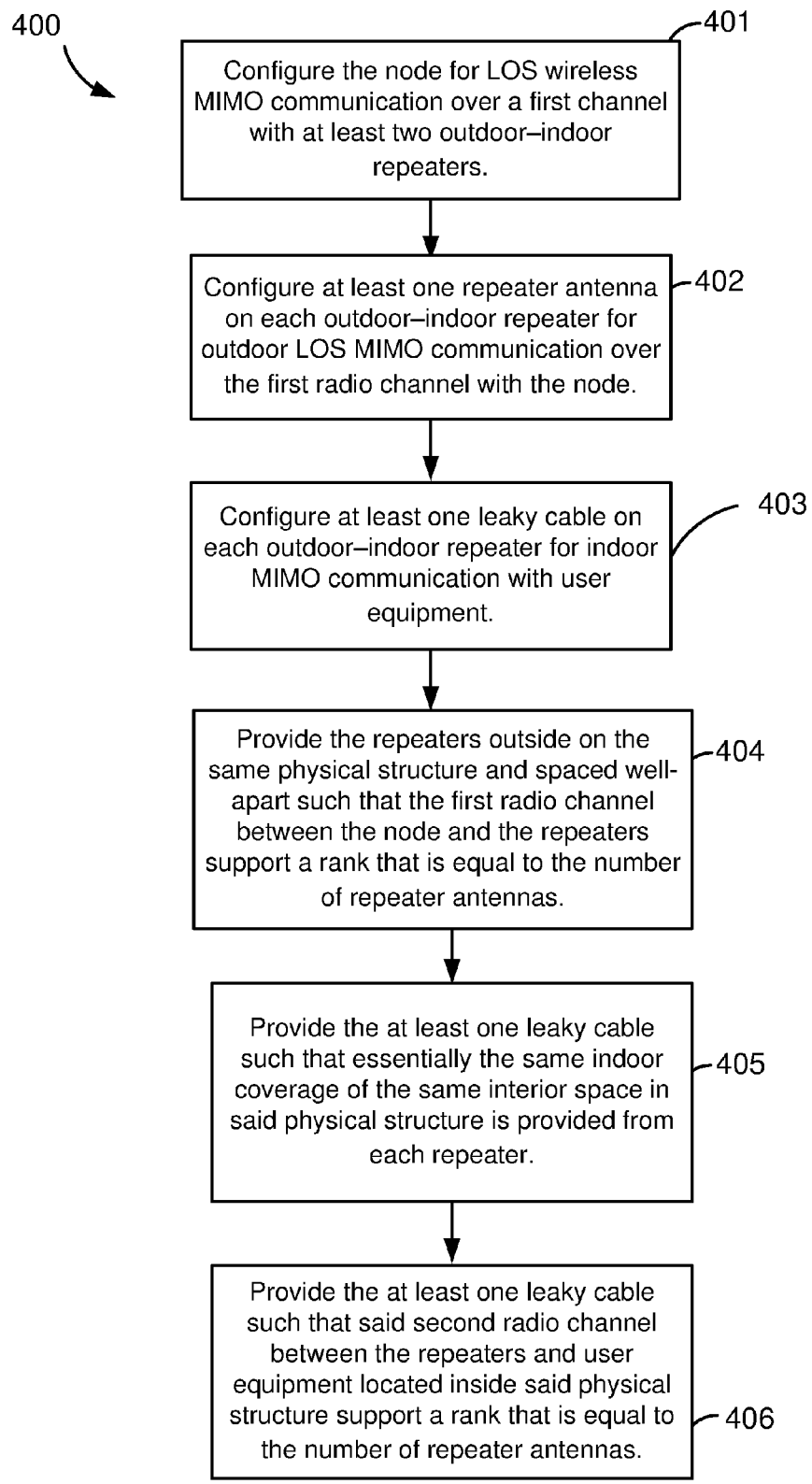
FIG. 4 illustrates a typical wireless communications scenario in which the present invention may be employed.

FIG. 4 shows a flowchart describing the main steps in a method for providing LOS wireless MIMO communication 400 between a node, located outside a physical structure, and user equipment, located inside said physical structure. The method comprises the steps of;

I) configuring 401 said node for LOS wireless MIMO communication with at least two outdoor-indoor repeaters provided outside said physical structure;

II) configuring 402 at least one repeater antenna on each said outdoor-indoor repeater, located outside said physical structure, for outdoor LOS MIMO communication with said node; and III) configuring 403 at least one leaky cable on each said outdoor-indoor repeater, located inside said physical structure, for indoor MIMO communication with said user equipment located inside said physical structure; and IV) providing 404 the repeaters outside on the same physical structure and spaced well-apart such that the first radio channel between the node and the repeaters support a rank that is equal to the number of repeater antennas; and V) providing 405 the at least one leaky cable such that essentially the same indoor coverage of the same interior space in said physical structure is provided from each repeater; and VI) providing 406 the at least one leaky cable such that said second radio channel between the repeaters and user equipment located inside said physical structure support a rank that is equal to the number of repeater antennas.

As described in the above embodiments of the present invention it is important that the repeaters are provided on the same physical structure but spaced well-apart (such that the first radio channel between the node and the repeaters support a rank that is equal to the number of repeater antennas), if possible spacing them several meters apart, and that each leaky cable of each repeater is provided such that the second radio channel between the repeaters and user equipment located inside said physical structure support a rank that is equal to the number of repeater antennas and such that they provide essentially the same indoor coverage of essentially the same interior space in said physical structure. An example of this could for instance be to run one leaky cable along one wall in a corridor and run the other leaky cable on the opposite wall in the corridor. Another way would be to run both cables close to the ceiling but spaced apart.

FIGS. 5a to 5f shows six flowcharts with six optional enhancements or variations to the main method described in the flowchart 400 in FIG. 4.

As described in the flowchart in FIG. 5a the method may optionally comprise the step of configuring 501 said node antennas and said repeater antennas for dual-polarization communication.

As described in the flowchart in FIG. 5b the method may optionally comprise the step of configuring 502 said leaky cables for dual-polarization communication. This optional step may preferably be implemented together with the optional step 501 discussed in FIG. 5a.

As described in the flowchart in FIG. 5c the method may optionally comprise the step of configuring 503 said each repeater to comprise the same number of leaky cables as the number of repeater antennas.

As described in the flowchart in FIG. 5d the method may optionally comprise the step of configuring 504 a first and a second repeater to share at least one leaky cable, and wherein said first repeater is adapted to feed said shared at least one leaky cable at one end, and said second repeater is adapted to feed said shared at least one leaky cable at the other end.

As described in the flowchart in FIG. 5e the method may optionally comprise the step of configuring 505 a first repeater to share at least one leaky cable with a second repeater and to share at least one other leaky cable with a third repeater, wherein said first repeater is adapted to feeds said shared at least one leaky cable at one end and said second repeater is adapted to feed said shared at least one leaky cable at the other end, and wherein said first repeater is further adapted to feed said shared at least one other leaky cable at one end and said third repeater is adapted to feed said shared at least one other leaky cable at the other end.

As described in the flowchart in FIG. 5f the method may optionally comprise the step of configuring 506 at least four repeaters to share at least one leaky cable with another repeater, and configuring said at least four repeaters to be connected as to form a linear daisy chain of repeaters sharing at least one leaky cable with another repeater. However, the method is not limited to making connections forming linear daisy chains. The method may also allow the "ends" of the daisy chain to connect to each other forming a circular or closed daisy chain of repeaters sharing at least two leaky cables with neighboring repeaters. The method may also allow mixing both closed and linear daisy chains of repeaters sharing at least one leaky cable with a neighboring repeater.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A wireless outdoor-indoor multiple-input multiple-output (MIMO) communications system for communicating with a user equipment located inside a physical structure, comprising:
   a first repeater;
   a second repeater; and
   a node adapted for wireless MIMO communication, having at least two node antennas, wherein said node is further configured for line of sight (LOS) wireless communication over a first radio channel with the first repeater and the second repeater, wherein
   said first repeater has a first repeater antenna provided outside said physical structure for outdoor LOS communication with said node,
   said second repeater has a second repeater antenna provided outside said physical structure for outdoor LOS communication with said node,
   said first repeater is connected to and feeds a first leaky cable provided inside said physical structure for indoor communication over a second radio channel with said user equipment located in an interior space of said physical structure,
   said second repeater is connected to and feeds one or more of: said first leaky cable and a second leaky cable provided inside said physical structure for indoor communication with said user equipment located in an interior space of said physical structure,
   said first and second repeater antennas are spaced apart such that the first radio channel between the node and the first and second repeater antennas support a rank that is greater than or equal to two.

2. The wireless communication system according to claim 1, wherein said first and second repeater antennas are spaced at least three meters apart.

3. The wireless communication system according to claim 1, wherein said node antennas and said repeater antennas are dual-polarized antennas.

4. The wireless communication system according to claim 1, wherein
said second repeater is connected to a second leaky cable provided inside said physical structure for indoor communication over a second radio channel with said user equipment located in an interior space of said physical structure,
said second leaky cable being separate and distinct from the first leaky cable.

5. The wireless communication system according to claim 4, wherein
said first repeater feeds into the first leaky cable at a first end of the first leaky cable a first signal corresponding to a signal received via the first repeater antenna,
said first repeater feeds into the second leaky cable at a first end of the second leaky cable said first signal,
said second repeater feeds into the first leaky cable at a second end of the first leaky cable a second signal corresponding to a signal received via the second repeater antenna, said second end of the first leaky cable being opposite of the first end of the first leaky cable, and
said second repeater feeds into the second leaky cable at a second end of the second leaky cable the second signal, said second end of the second leaky cable being opposite of the first end of the second leaky cable.

6. The wireless communication system according to claim 1, wherein
said first repeater feeds into said first leaky cable at a first end of the first leaky cable a first signal corresponding to a signal received via the first repeater antenna, and
said second repeater is connected to and feeds into said first leaky cable at a second end of the first leaky cable a second signal corresponding to a signal received via the second repeater antenna, said second end of the first leaky cable being opposite of the first end of the first leaky cable.

7. The wireless communication system according to claim 6, further comprising:
a third repeater having a third repeater antenna provided outside said physical structure for outdoor LOS communication with said node,
said first repeater is connected to and feeds into a second leaky cable at a first end of the second leaky cable a first signal corresponding to a signal received via the first repeater antenna,
said third repeater is connected to and feeds into said second leaky cable at a second end of the second leaky cable a second signal corresponding to a signal received via the third repeater antenna, said second end of the second leaky cable being opposite of the first end of the second leaky cable.

8. The wireless communication system according to claim 7, further comprising a third leaky cable and a fourth leaky cable, wherein
said second repeater is connected to and feeds into the third leaky cable at a first end of the third leaky cable the second signal, and
said third repeater is connected to and feeds into the fourth leaky cable at a first end of the fourth leaky cable the third signal.

9. A method for providing wireless MIMO communication between a node, located outside a physical structure, and user equipment, located inside said physical structure, the method comprising:
configuring said node for line of sight (LOS) wireless MIMO communication over a first radio channel with a first repeater and a second repeater, wherein the first and second repeaters are located outside said physical structure;
configuring a first repeater antenna on said first repeater for outdoor LOS MIMO communication over said first radio channel with said node;
configuring a second repeater antenna on said second repeater for outdoor LOS MIMO communication over said first radio channel with said node;
configuring the first repeater to feed a first leaky cable provided inside said physical structure for indoor communication over a second radio channel with said user equipment located in an interior space of said physical structure,
configuring the second repeater to feed one or more of: said first leaky cable and a second leaky cable provided inside said physical structure for indoor communication with said user equipment located in an interior space of said physical structure, wherein
said first and second repeater antennas are spaced apart such that the first radio channel between the node and the first and second repeater antennas support a rank that is greater than or equal to two.

10. The method according to claim 9, further comprising configuring said node antennas and said first and second repeater antennas for dual-polarization communication.

11. The method according to claim 9, further comprising configuring said first leaky cable for dual-polarization communication.

12. The method according to claim 9, wherein said first and second repeater antennas are spaced at least three meters apart.

13. The method according to claim 9, wherein
the second repeater is configured such that said second repeater is connected to a second leaky cable provided inside said physical structure for indoor communication with said user equipment, and
said second leaky cable is separate and distinct from the first leaky cable.

14. The method according to claim 13, wherein the first and second repeaters are configured such that:
said first repeater feeds into the first leaky cable at a first end of the first leaky cable a first signal corresponding to a signal received via the first repeater antenna,
said first repeater feeds into the second leaky cable at a first end of the second leaky cable said first signal,
said second repeater feeds into the first leaky cable at a second end of the first leaky cable a second signal corresponding to a signal received via the second repeater antenna, said second end of the first leaky cable being opposite of the first end of the first leaky cable, and
said second repeater feeds into the second leaky cable at a second end of the second leaky cable the second signal, said second end of the second leaky cable being opposite of the first end of the second leaky cable.

15. The method according to claim 9, wherein the first and second repeaters are configured such that:
said first repeater feeds into said first leaky cable at a first end of the first leaky cable a first signal corresponding to a signal received via the first repeater antenna, and
said second repeater is connected to and feeds into said first leaky cable at a second end of the first leaky cable a second signal corresponding to a signal received via the second repeater antenna, said second end of the first leaky cable being opposite of the first end of the first leaky cable.

16. The method according to claim 15, further comprising:
configuring a third repeater having a third repeater antenna provided outside said physical structure for outdoor LOS communication with said node, wherein the first and third repeaters are configured such that:
said first repeater is connected to and feeds into a second leaky cable at a first end of the second leaky cable a first signal corresponding to a signal received via the first repeater antenna, and
said third repeater is connected to and feeds into said second leaky cable at a second end of the second leaky cable a second signal corresponding to a signal received via the third repeater antenna, said second end of the second leaky cable being opposite of the first end of the second leaky cable.

17. The method according to claim 16, wherein the second and third repeaters are configured such that:
said second repeater is connected to and feeds into a third leaky cable at a first end of the third leaky cable the second signal, and
said third repeater is connected to and feeds into a fourth leaky cable at a first end of the fourth leaky cable the third signal.

\* \* \* \* \*